(12) United States Patent  (10) Patent No.: US 8,179,230 B2
Lacour et al.                (45) Date of Patent:     May 15, 2012

(54) METHOD FOR PASSIVE KEYLESS ENTRY OF A MOTOR VEHICLE ESPECIALLY OF AN INDUSTRIAL VEHICLE

(75) Inventors: Nicolas Lacour, Villeurbanne (FR); Loïc Vincent, Venissieux (FR)

(73) Assignee: Renault Trucks, Saint Priest (FR)

( * ) Notice: Subject to any disclaimer, the term of this patent is extended or adjusted under 35 U.S.C. 154(b) by 893 days.

(21) Appl. No.: 12/159,631

(22) PCT Filed: Dec. 29, 2005

(86) PCT No.: PCT/IB2005/004059
§ 371 (c)(1),
(2), (4) Date: Sep. 18, 2008

(87) PCT Pub. No.: WO2007/074354
PCT Pub. Date: Jul. 5, 2007

(65) Prior Publication Data
US 2010/0007461 A1   Jan. 14, 2010

(51) Int. Cl.
G07C 9/00 (2006.01)
B60R 25/00 (2006.01)
(52) U.S. Cl. .............. 340/5.72; 340/5.61; 340/426.11; 340/426.36
(58) Field of Classification Search ........... 340/5.61, 340/5.62, 5.72, 5.31, 426.11, 426.12, 426.13, 340/426.16, 426.17, 426.36; 307/10.2, 10.3, 307/10.4, 10.5, 10.7
See application file for complete search history.

(56) References Cited

U.S. PATENT DOCUMENTS

| 4,663,626 A * | 5/1987 | Smith ..................... 340/12.5 |
| 5,449,957 A * | 9/1995 | Carlo ..................... 307/10.3 |
| 5,515,036 A | 5/1996 | Waraksa et al. |
| 5,751,073 A | 5/1998 | Ross et al. |
| 6,329,909 B1 * | 12/2001 | Siedentop et al. ........... 340/5.62 |
| 6,433,442 B1 * | 8/2002 | Mackel et al. ............... 307/10.7 |
| 6,617,961 B1 | 9/2003 | Janssen et al. |
| 2002/0089411 A1 * | 7/2002 | Hazelton et al. ............. 340/5.64 |
| 2005/0046546 A1 | 3/2005 | Masudaya |
| 2006/0017550 A1 * | 1/2006 | Yoshida et al. .......... 340/426.11 |
| 2006/0055510 A1 * | 3/2006 | Little et al. .................... 340/5.62 |

FOREIGN PATENT DOCUMENTS

| DE | 10007500 A1 | 9/2001 |
| DE | 10158196 A1 | 6/2003 |
| EP | 1077301 A | 2/2001 |
| EP | 1101887 A | 5/2001 |
| EP | 1411477 A | 4/2004 |
| EP | 1428694 A | 6/2004 |
| EP | 1457932 A | 9/2004 |

OTHER PUBLICATIONS

International Search Report for corresponding International Application PCT/IB2005/004059.

* cited by examiner

*Primary Examiner* — Edwin Holloway, III
(74) *Attorney, Agent, or Firm* — WRB-IP LLP

(57) ABSTRACT

A vehicle unlocking sequence includes passively authenticating a vehicle user, granting the authenticated vehicle user access to the vehicle and setting the vehicle main switch into an on-state. A vehicle locking sequence includes passively authenticating the vehicle user, configuring the vehicle, upon a first action from the authenticated vehicle user, into a first locking mode whereby access to the vehicle is denied to a non authenticated user, or configuring the vehicle, upon a second action from the authenticated vehicle user, into a second locking mode whereby access to the vehicle is denied to a non authenticated user and the vehicle main switch is set into an off-state.

12 Claims, 5 Drawing Sheets

METHOD FOR PASSIVE KEYLESS ENTRY OF A MOTOR VEHICLE ESPECIALLY OF AN INDUSTRIAL VEHICLE

BACKGROUND AND SUMMARY

The present invention concerns a method for passive keyless entry of a motor vehicle especially of an industrial vehicle.

In the recent years, some motor vehicles have been equipped with passive keyless entry systems which make it possible to gain entry to a vehicle without requiring any action from a vehicle user.

Typically, a passive keyless entry system includes a two way radio communication between a vehicle and an electronic key which is carried by the vehicle user. A passive keyless entry system may employ one or more antennas fitted in the vehicle. The antennas are capable of detecting the presence of the electronic key within an operative area of a few meters.

The system can be designed to give vehicle access, usually by unlocking one or more vehicle door(s), when the electronic key is within the operative range of the antennas. Access to the vehicle is given after an authentication of the electronic key.

Alternatively, to avoid a constant monitoring of the presence of the electronic key and, thus consuming electric power, the system can be designed to wait for a trigger which conveniently is the user's action to lift a door handle. This trigger is the event which the system uses to query the electronic key and determine whether or not to grant vehicle access to the user.

An industrial vehicle such as a truck may benefit greatly from a passive keyless entry system in term of user comfort.

One of the many specific features of an industrial vehicle is the presence of main switch or isolation switch. A main switch is an on-off switch that controls the current from the battery storage. The main switch can be located on the battery box or on the vehicle cabin floor. The function of the main switch is to isolate the battery from the vehicle electrical circuit. This proves useful to spare battery electric power when a vehicle is at a standstill for a long period of time. This also proves useful during the loading operation of a potentially explosive cargo whereby any electric arc has to be avoided.

In light of the above technological background, it is desirable to provide a passive keyless entry system for an industrial vehicle. An aspect of the invention concerns a keyless entry and exit method for a vehicle which includes a vehicle main switch. The method comprises (i) a vehicle unlocking sequence. This sequence comprises the steps of passively authenticating the vehicle user, granting the authenticated vehicle user access and turning the vehicle main switch into an on state. The method further comprises (ii) a vehicle locking sequence. This sequence comprises the steps of passively authenticating the vehicle user, and configuring the vehicle, upon a first action from the authenticated vehicle user, into a first locking mode whereby access to the vehicle is denied to a non authenticated user, or configuring the vehicle, upon a second action from the authenticated vehicle user, into a second locking mode whereby access to the vehicle is denied to a non authenticated user and the vehicle main switch is turned into an off state.

An aspect of the invention, therefore, offers a method which takes into account a specific feature of an industrial vehicle. An important aspect of an aspect of the invention is that the command of a vehicle main switch which is a common feature of industrial vehicles is integrated in a passive keyless method to unlock and lock a vehicle. An aspect of the invention provides a passive entry and exit method of an industrial vehicle and integrates the control of the vehicle main switch. The term passive is to be understood from a user point of view; in the present invention, the term passive means that no authentication input is to be required from the user as opposed to, for example, a traditional key based system where the user has to find the key and enter said key into a keyhole or as opposed to a remote keyless system where the user has to find a transmitter and, then, has to press a button on said transmitter. With the present invention, the user is passively authenticated and can then configure the vehicle in an appropriate locking mode.

In a preferred embodiment of an aspect of the invention, the user authentication can be based on bidirectional communication between a portable identification unit and an onboard control unit which is connected to vehicle locking means and to the vehicle main switch.

It is envisaged that the first locking mode can comprise the step of locking each of the vehicle opening devices. The first locking mode is adapted to the case of a user leaving the vehicle for a short period of time.

It is envisaged that the second locking mode can comprise the steps of locking each of the vehicle opening device and turning the vehicle main switch into an off state. The second locking mode is adapted to the case of a user leaving the vehicle for a long period of time that is to say a period of time during which the battery may lose its power if it is not isolated.

The first locking action that sets the vehicle into the first locking mode can consist of or comprise pressing once onto a push button located on the external side of the vehicle.

The second locking action that sets the vehicle into the first locking mode can consist or comprise, for example, of pressing twice onto the push button.

DETAILED DESCRIPTION

Figure 1:
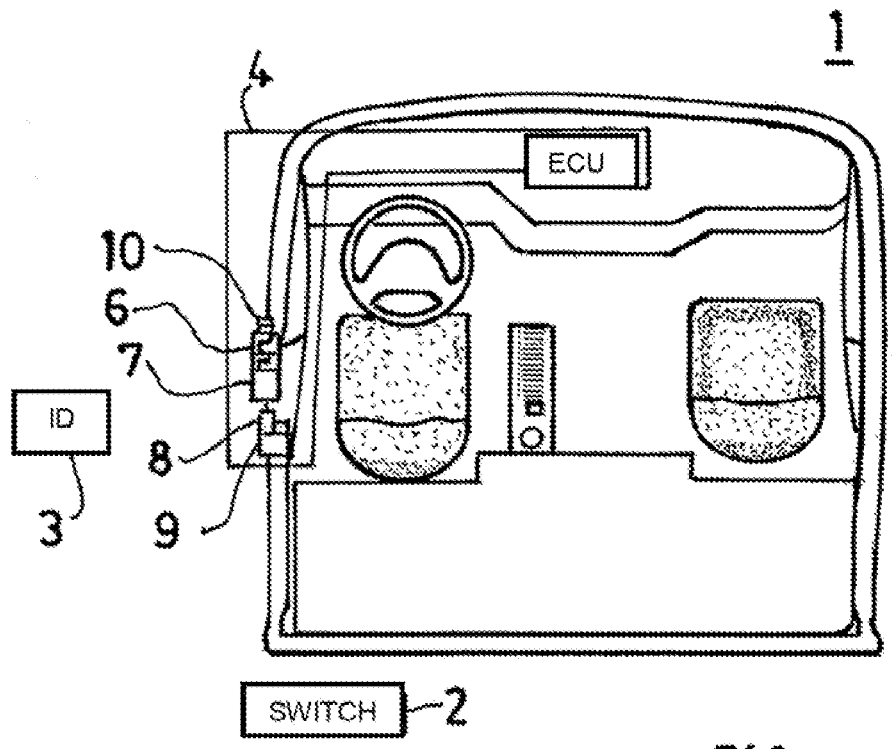
FIG. 1 diagrammatically illustrates a vehicle having a system capable of implementing a method according to the invention.

FIG. 1 depicts an industrial vehicle 1 of the truck type. A technical feature of specific interest for the present invention is a vehicle main switch 2. A main switch 2 is an on-off switch which is located immediately downstream of a vehicle battery and therefore can isolate the battery from the vehicle electric circuit.

The present invention concerns a vehicle passive keyless entry system which can include a passive portable identification unit 3 and an onboard control unit 4.

The portable identification unit 3 can be, for example, a card which can be easily carried by a user, for example, in a pocket or a bag. The passive portable identification unit 3 authenticates the identity of the user. In other words, for security reasons, the access to a vehicle must be granted to a legitimate user i.e. a user that carries a portable identification unit 3 suitable to gain access to a certain vehicle.

Authentication can rely on a bidirectional communication between the passive portable identification unit 3 and the onboard control unit 4.

Typically, the onboard control unit 4 can include an electronic control unit ECU 5. The ECU 5 can suitably be comprised of a microprocessor with I/O interface, ROM and RAM.

In the onboard control unit 4 of the vehicle, the ECU 5 is associated with at least one vehicle door handle 6; more specifically the ECU 5 can be linked to a detection sensor such as for example a capacitive circuit which can be embedded in the door handle 6 and is capable of detecting a contact of a user with said door handle 6. The ECU 5 is connected to at least one vehicle door latch 7 and can order the unlocking or locking of said vehicle door. As shown on FIG. 1, the ECU 5 is also linked to one or more low frequency antennas 9 which are capable of emitting a low frequency radio signal in an area of a few meters around the vehicle. Typically, there are as many antennas 9 as there are doors in the vehicle. The ECU 5 is also suitably connected to the vehicle main switch 2, that is to say the ECU 5 can control the on or off state of the main switch 2.

It should also be noted that, the vehicle can be equipped with a push button 10 and a capacitive sensor which conveniently can be located next to the vehicle door handle 6. The push button 10 is also suitably connected to the ECU 5. The communication between the ECU 5 and each unit can be suitably achieved through individual wire communication or multiplexed communication.

The passive portable identification unit 3 can include a low frequency receiver typically in a range from 125 kHz to 13.6 MHz and a high frequency transmitter typically in a range from 315 MHz to 900 MHz. As the passive portable identification unit 3 carries a transmitter, it needs to be powered by a battery. The passive portable identification unit 3 can be, for example, the size of credit card which is easy to carry.

When a user wants to gain entry to a vehicle 1 which is in a locked state, the system can operate within the following unlocking sequence with reference to the appended drawings.

First of all, it is assumed that the user carries a passive portable identification unit 3. At a step 100, the user approaches the vehicle and lifts or pulls the door handle 6; by doing so, a signal is transmitted from the door handle 6 to the ECU 5 indicating an intention to enter the vehicle. This step is illustrated on FIG. 2.

At this stage (step 200 of FIG. 9), the system has to perform an authentication operation on the user.

Figure 2:
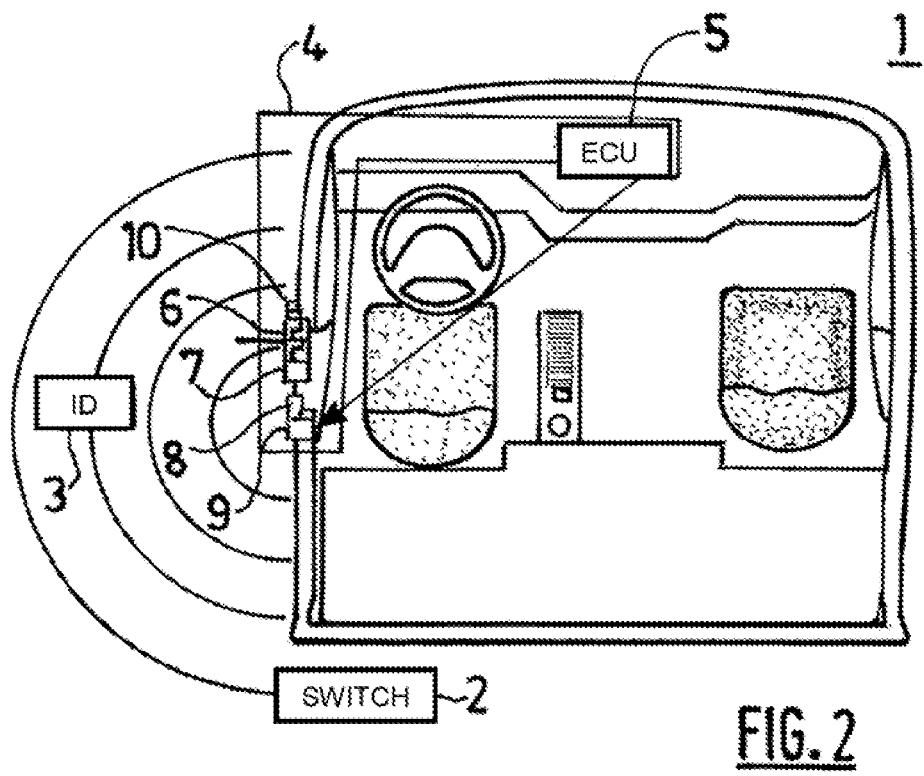
FIG. 2 to 8 illustrate each step of a method according to the invention on a vehicle of FIG. 1, FIGS. 9 and 10 are two flow charts illustrating the method of the invention.
Figure 3:
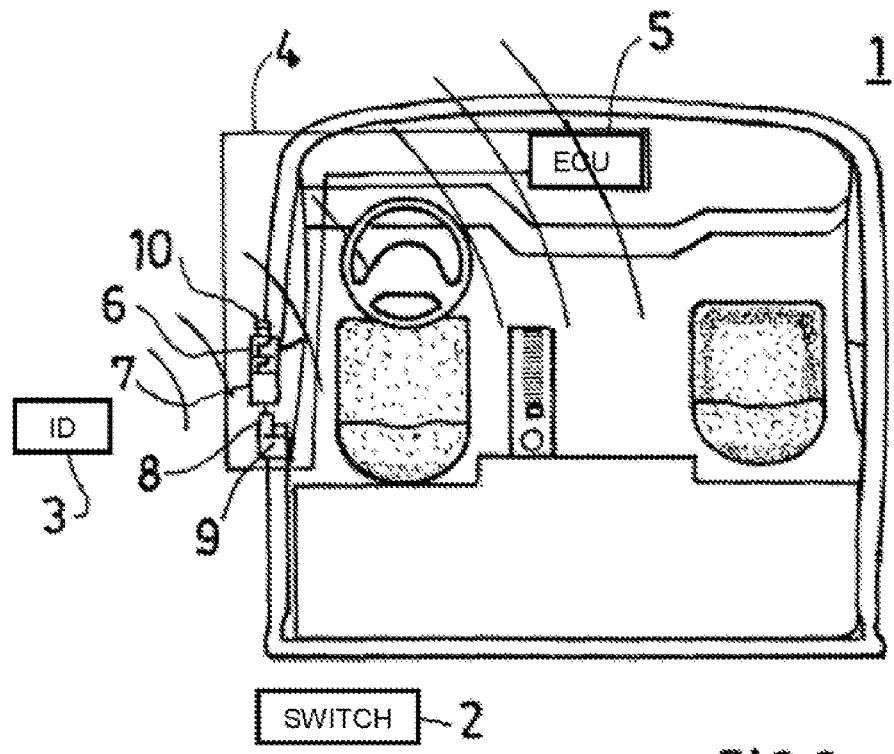
Figure 4:
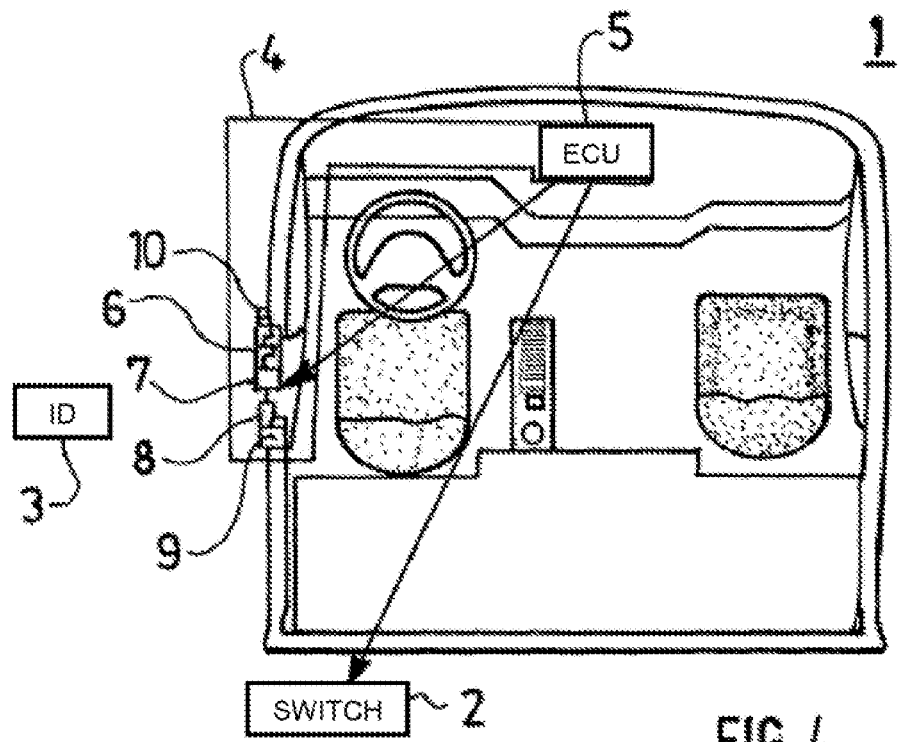

As this is shown on FIG. 2, the ECU 5 can transmit a signal to the low frequency antennas 9. Typically, to authenticate the user, the ECU 5 sends a random challenge to the passive portable identification unit 3. The passive portable identification unit 3 encrypts this value and send it back to the vehicle as illustrated on FIG. 3. The ECU 5 performs a similar encryption and compares the value received from the passive portable identification unit 3 and the value calculated at the ECU 5; if the value matches the values calculated at the ECU 5, the user is successfully authenticated and the unlocking sequence continues.

At a step 300, the ECU 5 can transmit a signal to mechanically unlock the door latch 7; thereby the ECU 5 authorizes the user to gain entry to the vehicle. At step 400, the ECU 5 checks the state of the main switch 2. If the main switch 2 is in an off state, a signal is transmitted to the ECU 5 to close said main switch 2.

At this stage, the user can enter the vehicle 1 and the vehicle 1 is in a configuration whereby the vehicle can be started. A passive start procedure can be carried out whereby the user who is at the wheel of the vehicle undergoes a further authentication procedure whereby it is controlled that the user does carry a suitable passive portable unit 3 and can start the vehicle by simply pushing a button on the dash board.

Now, if the user intends to leave the vehicle 1, two vehicle locking modes can be activated upon a specific action of the user. Each vehicle locking mode corresponds to a specific use of the vehicle.

The vehicle user can activate a first locking mode which in most cases corresponds to a short term vehicle standstill.

At step 600, the vehicle user leaves the vehicle and closes a vehicle door; a door state sensor can inform the ECU 5 that the door is closed.

Figure 5:
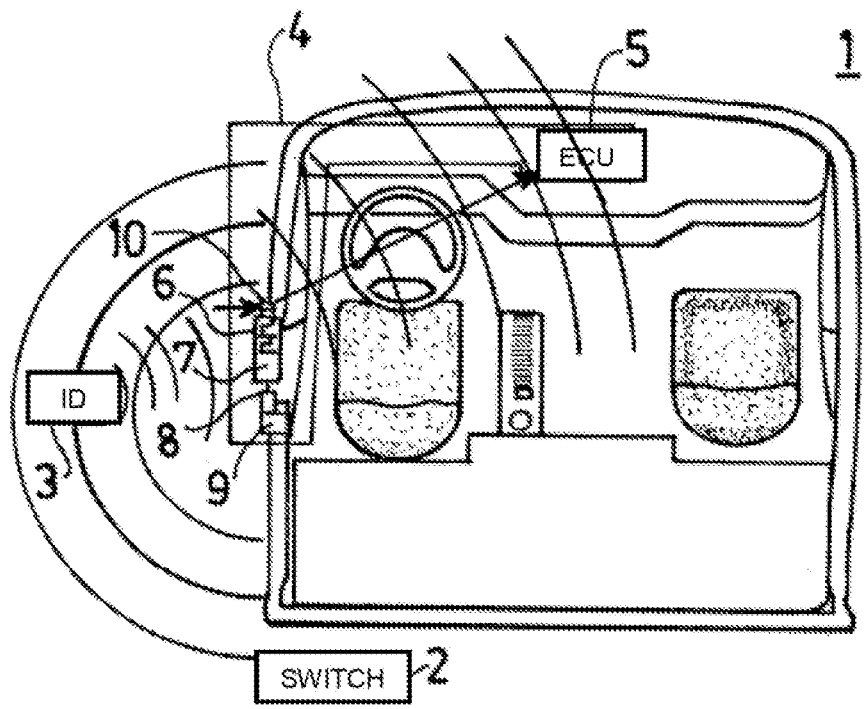

The vehicle user can exert a first action which can be, for example, a single action on the push button 10. This first action is represented on FIG. 5 by a single arrow pointing to the push button 10.

Figure 9:
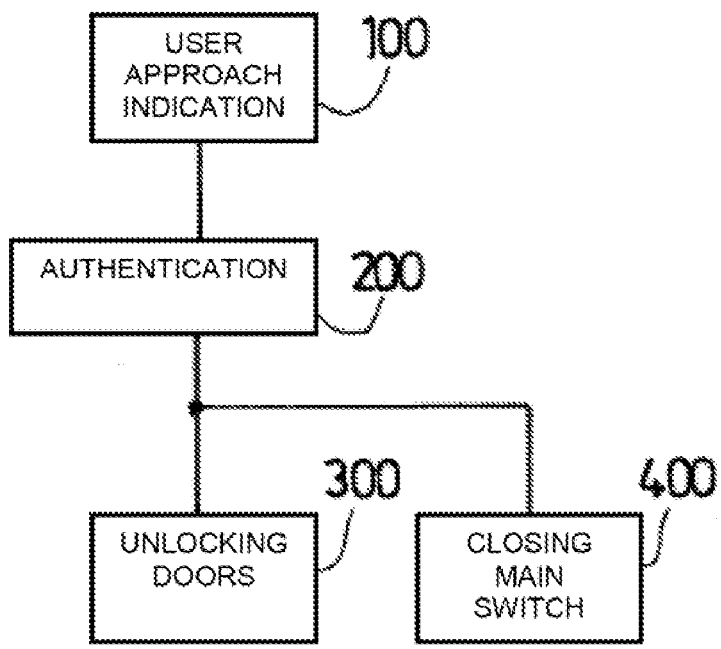
Figure 10:
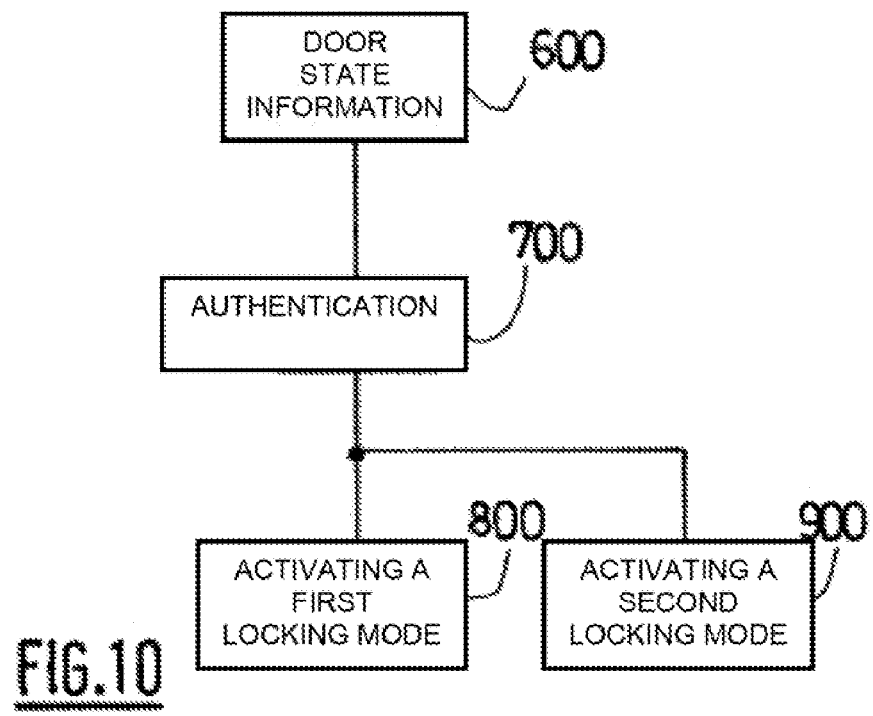

An authentication sequence represented by step 700 of FIG. 9 similar to the authentication action described above is then carried out to ensure that the user is authorised to perform such an action.

The vehicle 1 can also be configured into the first locking mode by the user walking away from the vehicle 1. In this case, the event that triggers the vehicle being set in the first locking mode is the user walking out of the field of the antenna 9.

Figure 6:
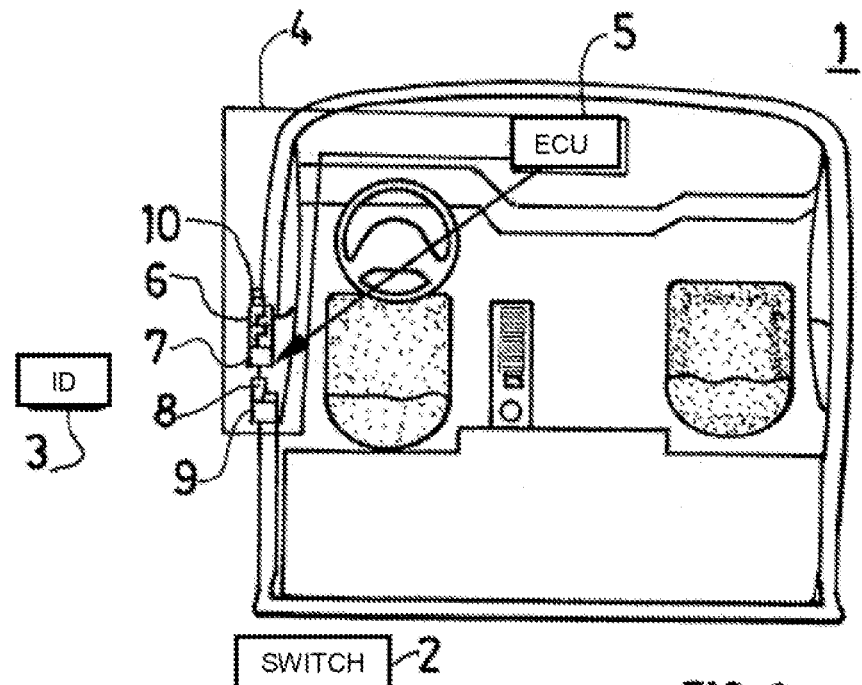

At step 800, the vehicle doors are locked. FIG. 6 depicts the locking signal transmitted to the door latch 7. The fact that the vehicle is in this first locking mode step can be backed by a visual signal such as for example a brief flash of light and/or a sonorous signal such as for example a brief hoot, thereby confirming to the user that the vehicle is locked according to the first locking mode.

Figure 7:
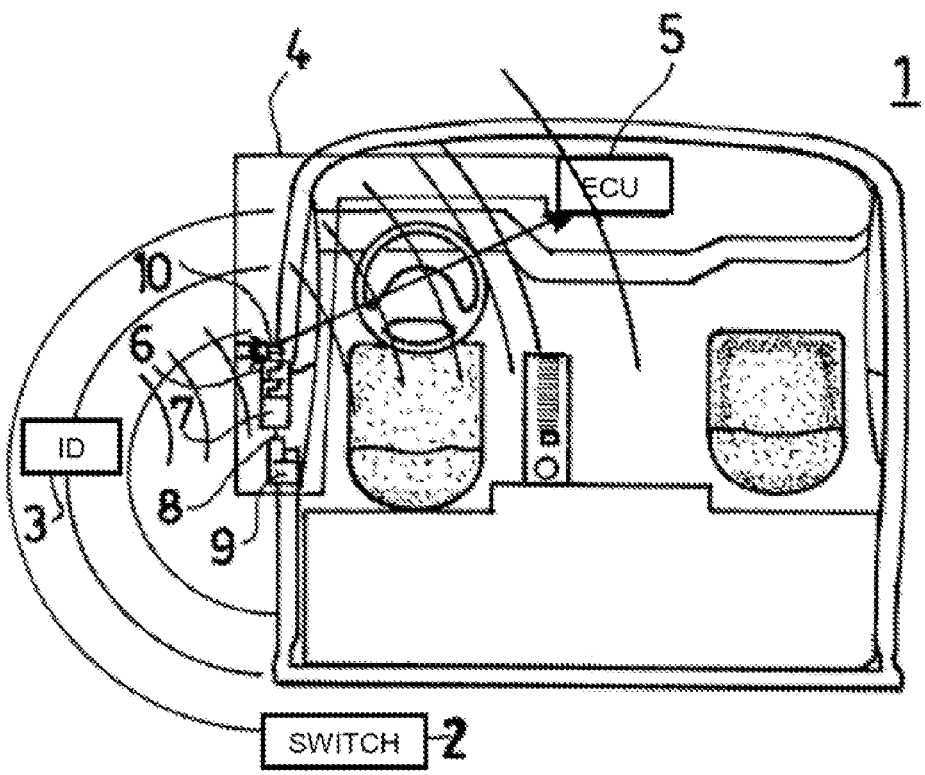

Alternatively, as represented by step 900, the vehicle user can activate a second locking mode which in most cases corresponds to a long term vehicle standstill. In this second locking mode, the vehicle user exerts a second action which can be, for example, a double action on the push button 10. FIG. 7 shows two arrows pointing to the push button 10. The second action could comprise a long pushing action on the push button 10.

To be taken into account by the onboard control unit 4, this input on the vehicle has to be carried out by a user who is in possession of a valid passive portable identification unit 3. The authentication is accomplished through the same bidirectional radio frequency exchange as described above.

Once the user through the portable identification unit 3 that he or she is carrying is authenticated, and the onboard control unit 4 has completed the authentication step, the ECU 5 transmits a locking order to each of the vehicle opening devices such as the vehicle doors and/or sunroof and/or gate.

Figure 8:
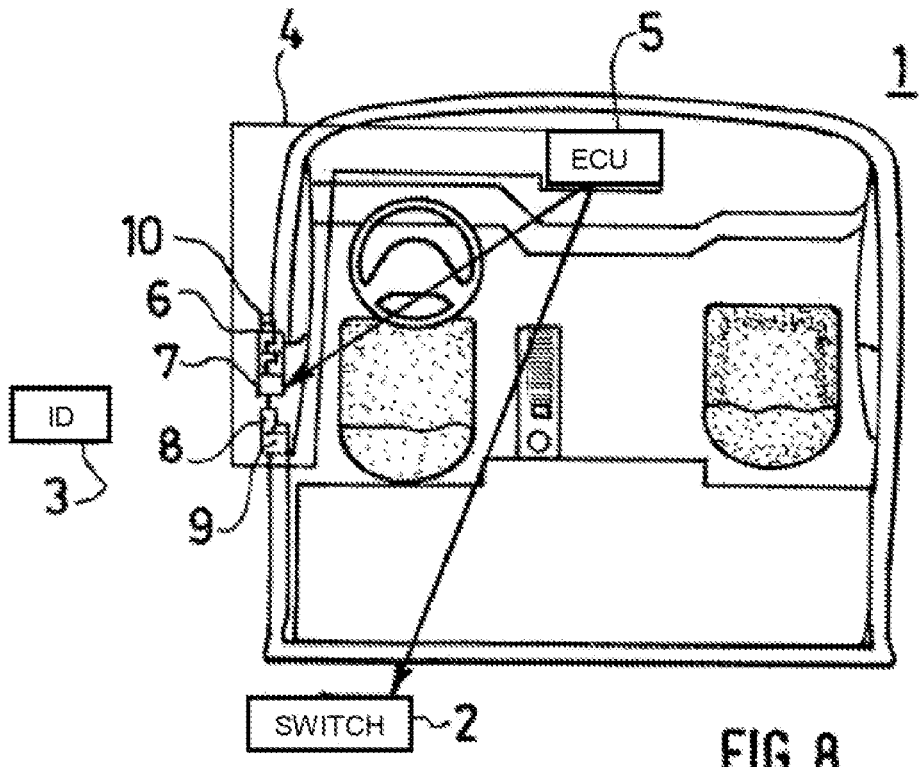

The ECU 5 also transmits a signal to the main switch 2 to put the main switch 2 in an off state as shown an FIG. 8. In this configuration, the vehicle can withstand a long term standstill as the vehicle battery is isolated. The fact that the vehicle is in this second locking mode step can be backed by a visual signal such as, for example, a long or a double flash of light and/or a sonorous signal such as, for example, a long or a double hoot. Thereby, the user has a further confirmation that the vehicle is locked according to the second locking mode.

It can be envisaged to provide the vehicle with two push buttons located, for example, next to the vehicle door handle 6; each push button which could be of a specific colour can set the vehicle in one the locking mode.

The invention is not limited to the illustrative embodiments described above and shown in the drawings, but can be varied within the scope of the following patent claims.

The invention claimed is:

1. A keyless entry and exit method for a vehicle which includes vehicle main switch, wherein the method comprises
   (i) performing a vehicle unlocking sequence which comprises the steps of passively authenticating a vehicle user, granting the authenticated vehicle user access to the vehicle and setting the vehicle main switch into an on-state,
   (ii) performing a vehicle locking sequence which comprises the steps of passively authenticating the vehicle user, and configuring the vehicle by the user choosing between a first action and a second action wherein, upon choosing the first action by the authenticated vehicle user, the vehicle is configured into a first locking mode whereby access to the vehicle is denied to a non authenticated user, or, upon choosing the second action by the authenticated vehicle user, the vehicle is configured into a second locking mode whereby access to the vehicle is denied to a non authenticated user and the vehicle main switch is set into an off-state.

2. The method according to claim 1, wherein user authentication is based on bidirectional communication between a portable identification unit and an onboard control unit which is connected to vehicle locking means and to the vehicle main switch.

3. The method according to claim 1, wherein configuring the vehicle into the first locking mode comprises the step of locking each of the vehicle opening devices.

4. The method according to claim 1, wherein configuring the vehicle into the second locking mode comprises the steps of locking each of the vehicle opening device and turning the vehicle main switch into an off state.

5. The method according to claim 1, wherein the first locking action comprises pressing once onto a push button located on the external side of the vehicle.

6. The method according to claim 5, wherein the second locking action comprises pressing twice onto the push button.

7. A keyless entry and exit method for a vehicle which includes a vehicle main switch, wherein the method comprises:
   configuring the vehicle into a first and a second locking mode of the vehicle,
      wherein the first locking mode corresponds to a configuration of the vehicle where the access to the vehicle is denied to a non authenticated user, and
      wherein the second locking mode corresponds to a configuration of the vehicle where the access to the vehicle is denied to a non authenticated user and the vehicle main switch is set into an off-state,
   performing a vehicle unlocking sequence and a vehicle locking sequence,
      wherein the vehicle unlocking sequence comprises the steps of passively authenticating a vehicle user, granting the authenticated vehicle user access to the vehicle and setting the vehicle main switch into an on-state,
      wherein the vehicle locking sequence comprises the steps of passively authenticating the vehicle user, configuring the vehicle, upon a first action from the authenticated vehicle user, into the first locking mode, or configuring the vehicle, upon a second action from the authenticated vehicle user, into the second locking mode.

8. The method according to claim 7, wherein user authentication is based on bidirectional communication between a portable identification unit and an onboard control unit which is connected to vehicle locking means and to the vehicle main switch.

9. The method according to claim 7, wherein configuring the vehicle into the first locking mode comprises the step of locking each of the vehicle opening devices.

10. The method according to claim 7, wherein configuring the vehicle into the second locking mode comprises the steps of locking each of the vehicle opening device and turning the vehicle main switch into an off state.

11. The method according to claim 7, wherein the first locking action comprises pressing once onto a push button located on the external side of the vehicle.

12. The method according to claim 11, wherein the second locking action comprises pressing twice onto the push button.

* * * * *